J. MYLOTT.
CAR FENDER.
APPLICATION FILED AUG. 26, 1909.

943,635.

Patented Dec. 14, 1909.

3 SHEETS—SHEET 1.

Witnesses:
H. B. Davis.
Cynthia Doyle.

Inventor:
John Mylott
by Noyes & Hanniman
Attys

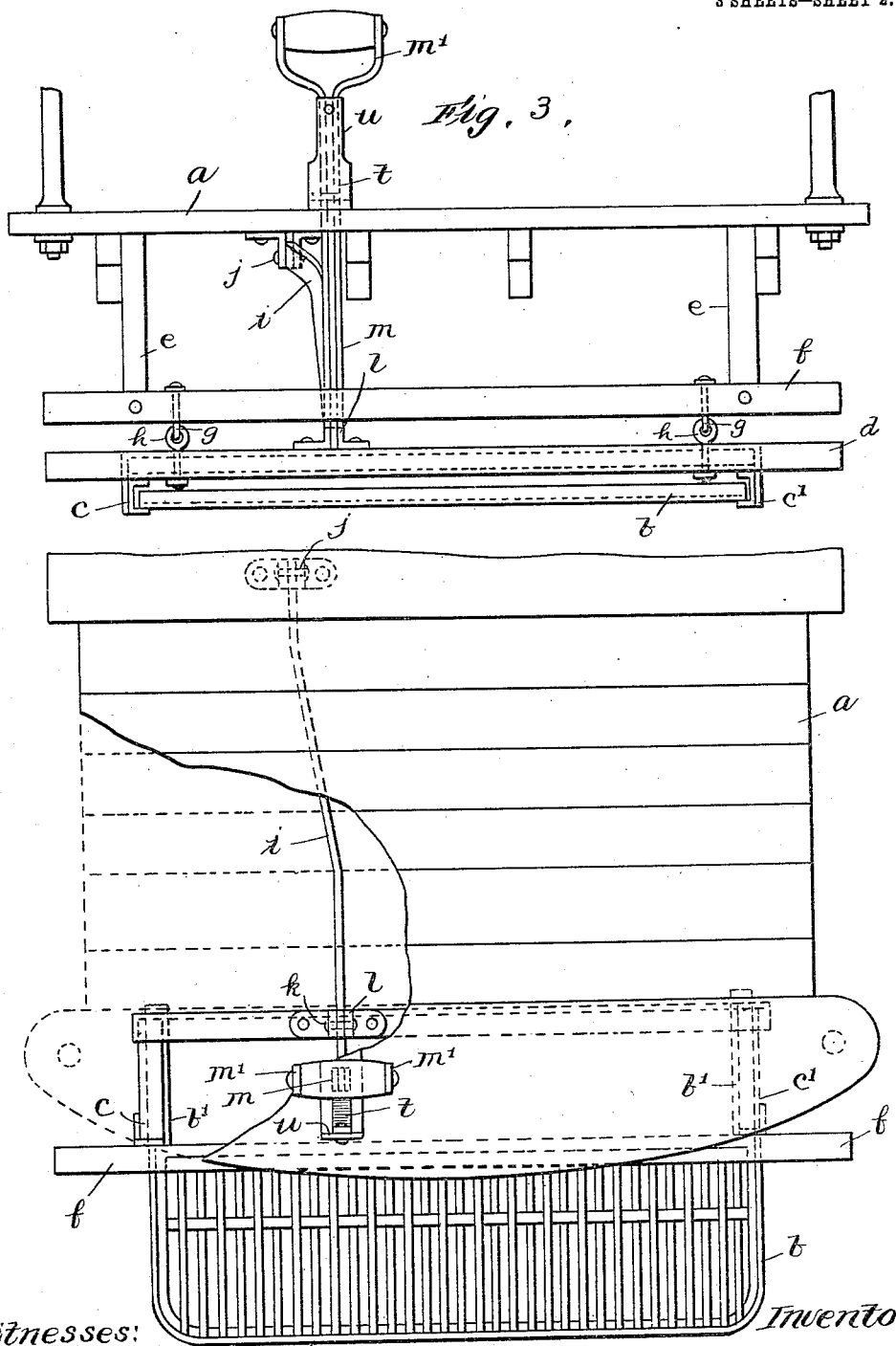

J. MYLOTT.
CAR FENDER.
APPLICATION FILED AUG. 26, 1909.
943,635.
Patented Dec. 14, 1909.
3 SHEETS—SHEET 3.
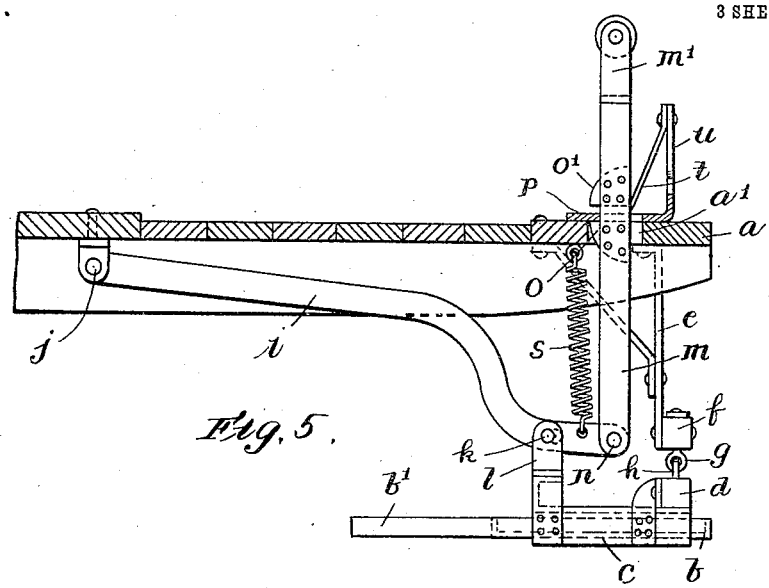
Fig. 5.
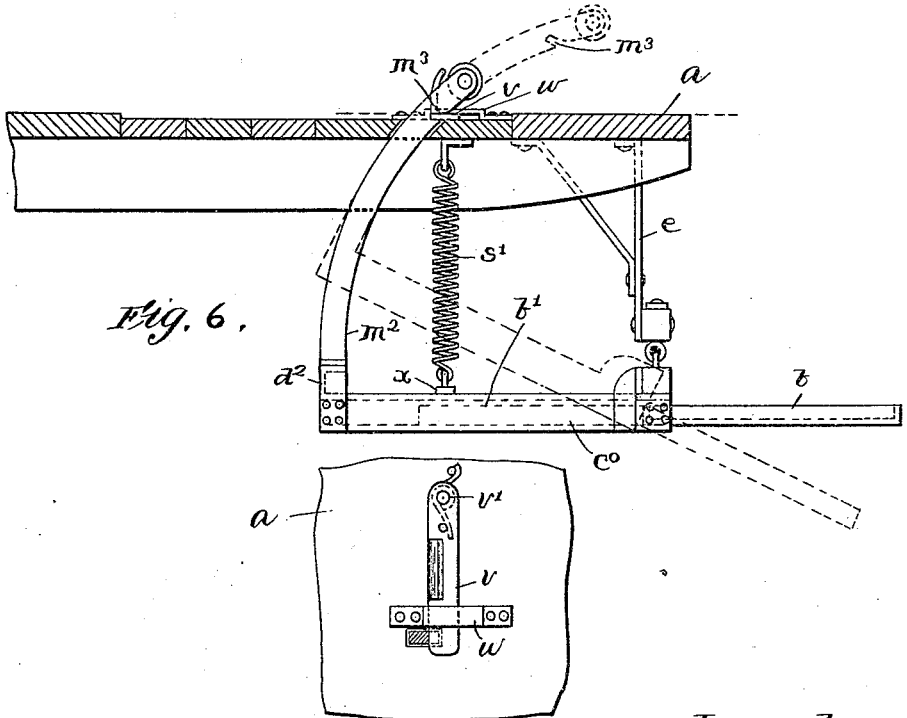
Fig. 6.
Fig. 7.
Witnesses:
H. B. Davis.
Cynthia Doyle
Inventor:
John Mylott
by Noyes & Karnman
Attys

UNITED STATES PATENT OFFICE.

JOHN MYLOTT, OF NORTH ANDOVER, MASSACHUSETTS, ASSIGNOR OF ONE-HALF TO GEORGE W. PRATT, OF HAVERHILL, MASSACHUSETTS.

CAR-FENDER.

943,635. Specification of Letters Patent. Patented Dec. 14, 1909.

Continuation of application Serial No. 487,542, filed April 2, 1909. This application filed August 26, 1909. Serial No. 514,710.

*To all whom it may concern:*

Be it known that I, JOHN MYLOTT, of North Andover, county of Essex, State of Massachusetts, have invented an Improvement in Car-Fenders, of which the following is a specification.

This invention relates to certain improvements in car fenders, and particularly those of the character in which the fender is adapted to be lowered from its normal position, so that the front end thereof will be held in close proximity to the ground, to prevent the passage of a body beneath the fender.

One of the types of car fenders in very general use is the type of fender which is practically flat and is held in an approximately horizontal position in guideways rigidly mounted at opposite ends of the car, so that the fender may be pushed back beneath the floor of the car, when not in use, and may be drawn out, so that it extends for a considerable distance in front of the car when it is to be used.

The object of my invention is to provide a simple form of fender which may be manufactured at an expense but slightly, if any, in excess of that of the ordinary fixed sliding fender, and which may be quickly lowered when desired, and may also be pushed back beneath the car when not in use.

A further object of my invention is to provide means whereby the ordinary flat, stationary fenders, above referred to, may be converted into dropping fenders at small expense without in any way detracting from their previously possessed advantages.

A further object of my invention is to provide a form of fender which may be almost instantly lowered in case of emergency and which is provided with a simple means for holding the same in raised position and for quickly releasing it and which enables the motorman to reset it without leaving the car.

Figure 1:
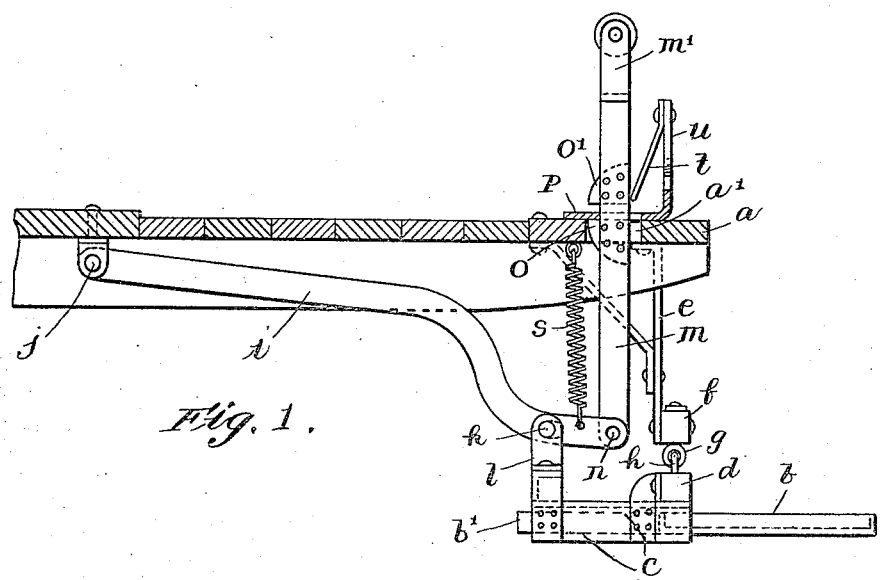
Figure 2:
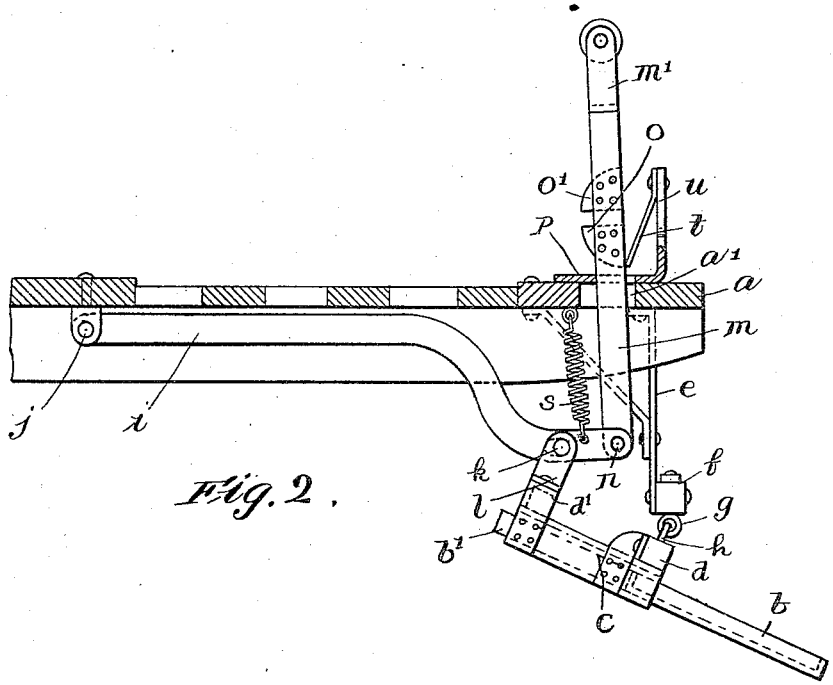

I accomplish these objects by the means shown in the accompanying drawing, in which, Figure 1 is a side elevation, partly in section, of a car fender and its supporting apparatus, made according to my invention and showing the fender in raised or normal position and drawn out in position for use. Fig. 2 is a similar view showing the fender in lowered position. Fig. 3 is a front elevation, and Fig. 4 is a plan view thereof. Fig. 5 is a view, similar to Fig. 1, showing the fender pushed back beneath the car. Fig. 6 is a similar view showing a modified form of my invention, and Fig. 7 is a detail plan view of a releasing latch which may be used in this connection.

In the drawing $a$ indicates one end of a car to which the apparatus is applied.

The fender comprises a fender-apron $b$, which is shown as consisting of a metal frame and lattice, and a holder, in which said apron is slidably mounted, said holder consisting of a rectangular-shaped frame composed of a pair of guideways or bars $c$, $c'$, connected by a pair of cross-bars $d$, $d'$ and which are secured to the outer sides and extend thereover at the front and rear ends thereof respectively, said cross-bars being thereby so arranged that the apron may be slid back in said guideways, so that its front end does not project beyond the end of the car. The apron $b$ is provided with rearwardly extending supporting arms $b'$, which extend to the rear ends of the guide-ways $c$ when the apron is drawn out in its normal position.

The mere provision of a fender apron which is mounted to slide in guide-ways forms no part of my invention and, for some of the purposes thereof, the fender apron and its holder may be considered as one construction permanently secured together, but the provision of means whereby such a fender, and its support is converted into a dropping fender, at small expense, and without in any way detracting from the advantages which it previously possessed, is an important feature of my invention.

The cross-bar $d$, which is secured to the guide-ways $c$ adjacent the front ends thereof, or which is located a short distance in the rear of the middle portion of the holder and fender apron, when considered as one, and when the fender apron is drawn out, is pivotally suspended from a pair of depending brackets, $e$, which are rigidly secured to the under side of the floor of the car, preferably through an intermediate cross bar $f$, which is rigidly mounted on the front sides of said brackets at their lower ends, by means of two pairs of interlocked eye bolts $g$, $h$, the eyes of the bolts $g$, in the upper bar $f$, being arranged in a plane extending longitudinally of the car and the eye bolts $h$, in bar $d$, being arranged in a plane at right angles thereto, so that a somewhat loose pivotal connection is provided between the bars $d$ and $f$, which permits the fender apron to swing nearly vertically at its front end and slightly rearwardly, as it is lowered, about an axis parallel to, and approximately midway between the bars $d$ and $f$. When the apron $b$ is drawn out, as shown in Fig. 1, the portion thereof in front of the axis will overbalance the frame or holder, and the portion of the apron in the rear of said axis, to a considerable extent.

A lever $i$ is pivotally mounted at its rear end on a bracket $j$, which is secured to the under side of the floor of the car adjacent the rear end of the platform, and said lever is connected by a pivot $k$, at a distance in the rear of its front end, to a bracket $l$, mounted on the upper side of the cross-bar $d'$, the aperture in lever $i$, through which pivot $k$ passes, being sufficiently elongated to permit enough lost motion to enable the fender to swing freely at the points at which it is suspended. A vertically disposed locking bar $m$, having a handle $m'$ at its upper end, is connected at its lower end, by a pivot $n$, to the front end of the lever $i$, said bar extending through a slot $a'$ formed in the car floor. A pair of lugs $o$, $o'$ are connected to the bar $m$, adjacent the middle portion thereof, said lugs being rounded or beveled on their opposite edges, and formed perpendicular to the bar at their adjacent edges, so that the lower lug $o$, forms an upwardly facing shoulder, adapted, to engage the under side of a slotted plate $p$, which is secured on the floor of the car with its slot in register with the slot $a'$, and through which the bar $m$ passes. The slot $p'$ is somewhat shorter than the slot $a'$ so that the rear portion of the plate projects over the slot $a'$ to an extent sufficient to provide an abutment adapted to enter the space or notch between said lugs $o$, $o'$, so as to hold said bar from longitudinal movement in either direction, when in engagement therewith. The arrangement is such that the fender will be held in its raised, or a nearly horizontal position, when said lug $o$ is in engagement with the under side of plate $p$.

A coil spring is connected at one end to the under side of the floor of the car and at its other end to the lever $i$, between the pivots $k$ and $n$, so that said spring constantly tends to swing the front end of the lever $i$ upwardly, when under tension, and therefore to lower the front end of the fender. A spring $t$ is mounted at its upper end on a bracket $u$, which is integral with, and projects vertically from the front edge, or opposite side of the bar $m$ from the lugs $o$, $o'$, said spring acting normally to press the rear edge of the bar against the projecting edge of the plate $p$, to prevent said bar from becoming disengaged therefrom.

With the above described construction, when the parts are in the position of Fig. 1, if it is desired to lower the fender, it is merely necessary for the motorman to kick forwardly with his foot against the bar $m$, so that the bar is swung forwardly and the lower lug $o$ is thrown out of engagement with the under side of the plate $p$, thereby permitting the fender to swing downwardly, at its front end, so that its front edge is close to the ground, the parts being thereby moved to the position of Fig. 2, and being actuated to move quickly to this position, by the weight of the fender and force of the springs $s$. The arrangement is such, that when the fender is lowered, its front end will swing nearly vertically and slightly rearwardly downward, and thus away from an object which might be engaged, and will thus be moved to the ground in practically the shortest possible time.

The motion which the motorman makes to release the fender is one which can be made more quickly than any other motion with the foot or leg:—for example, it may be fully accomplished while the foot is being moved into position to depress a rod or push button, as the motion of the foot in kicking forward the bar $m$, is all in one direction.

When it is desired to reset the fender in the normal position, it is merely necessary to press down on the handle $m'$, until the notch between the lugs, $o$, $o'$ is opposite the plate $p$, so that the bar may be swung back and its lug $o$ be engaged with the under side of the plate $p$. The upper lug $o'$ prevents swinging movement of the fender which might be caused by the up and down swinging of the car at its ends.

It will be noted that, as the holder $c$ is suspended from the fixed brackets $e$, movement of the holder longitudinally of the car or horizontal movement thereof, is at all times prevented, and, as the bar $m$ normally locks the holder in a horizontal position, it will be apparent that the guide-ways of the holder, in which the fender apron is slidably supported, will be normally held as if they were fixed with relation to the car, so that the apron may be slid back and forth as if said guide-ways actually were so fixed, and without in any way disturbing the raising and lowering means. That is, unless occasion requires that the fender be lowered, it will be supported as if no lowering mechanism were present.

While the weight of the fender would be sufficient to move the parts to the lowered position without the aid of spring $s$, yet, without this spring, this movement might be too slow, while with it the action is almost instantaneous. The spring *s* acts to hold the lug *o* firmly in an engagement with the plate *p*, so that the retaining spring *t*, while desirable as a matter of precaution, is not wholly necessary. Said spring *s*, moreover, performs a further advantageous function when the fender apron is pushed back in the holder, as shown in Fig. 5, in which position the weight is, to a great extent, transferred to the rear of the axis on which the fender swings, for the reason that it still acts to hold the lug *o* in firm engagement with the plate *p*, so that the parts are at all times as rigidly held, except when the bar *m* is intentionally swung forward to release the fender, as if the fender guide-ways were permanently fixed.

The lever *i* enables the pivotal connection of the bar *m* with the fender to be carried forward close to the point at which the fender is pivotally suspended, so that said bar may be held in an approximately vertical position and may be moved nearly vertically as the fender is raised and lowered, that is, the bar is moved nearly straight up when the fender is lowered and when the fender is raised or reset, the force exerted on the bar is directly downward. The mechanical advantage secured by this lever arrangement also enables the fender to be reset much more easily than if the bar *m* were directly connected to the fender.

In Figs. 6 and 7, I show a modified, but less desirable form of my invention, in which a locking bar $m^2$, corresponding to bar *m*, is rigidly connected to a cross-bar $d^2$, corresponding to the cross-bar *d'* before referred to, and which is attached to the fender guide-ways $c^0$. Said bar extends upwardly through an opening in the car floor, and is preferably curved on a radius having as its center the axis on which the fender and its guide-ways are pivotally suspended, as before described. A spring-pressed latch *v* is pivoted at *v'* on the car floor and is adapted to engage a notch $m^3$, in bar $m^2$, to hold the fender in horizontal position, said latch being extended beneath the clip *w*, so as to prevent the same from being swung upwardly. A spring *s'* is directly connected to the guide-ways $c^0$ by a cross-bar *x* secured thereto. The construction is otherwise substantially the same as that already described.

The operation will be obvious. When it is desired to lower the fender, the latch *v* is simply swung forward so that it is disengaged from the bar $m^2$, thereby permitting the parts to move to a position corresponding to the dotted position of Fig. 6. The fender is reset by pushing down on the bar $m^2$ and reëngaging latch *v* therewith.

This application is a continuation of my application filed April 2, 1909, Serial No. 487542, and now abandoned.

Having thus described my invention, what I claim as new and desire to secure by Letters Patent is:—

1. In combination with the car body, a holder pivotally suspended, at its front end, from said body to swing about a fixed axis, a fender apron slidably mounted on said holder, a locking device connected to said holder, in the rear of its pivot, for holding the apron in raised position, and means permitting the release of said locking device to permit the apron to be lowered, substantially as described.

2. In combination with a car body, a holder pivotally connected thereto to swing about a fixed axis, a spring normally acting on said holder to move the same from raised to lowered position, a fender apron slidably mounted on said holder, a locking-device connected to said holder and adapted to engage the body to hold the apron in raised position, and means permitting disengagement of said locking device and the body to permit the apron to be lowered, substantially as described.

3. In combination with a car body, a fixed bracket depending therefrom, a holder pivotally suspended from said bracket and held thereby from movement longitudinally of the body, a fender apron slidably mounted in said holder, a spring normally acting to move said apron and holder from raised to lowered position, a locking device connected to said holder and having means for engaging said body to hold said apron and holder in raised position and to permit the apron to be slid in the holder between its operative and inoperative positions, and means permitting disengagement of said body and said locking device to permit movement of the apron to lowered position, substantially as described.

4. In combination with a car body, a fender holder comprising a pair of guideways, a pair of cross bars rigidly connected to said guideways at different longitudinal points, means for pivotally connecting one of said cross bars to the body, a locking device connected to the other cross bar and having means for engaging the body to lock the holder in raised position, and means permitting disengagement of said locking device and said body to permit said holder to be moved to lowered position, substantially as described.

5. In combination with a car body, a fender holder comprising a pair of guideways, a pair of cross bars rigidly connected to said guideways at different longitudinal points and extending above said guideways to permit a fender apron to be slid thereon beneath said cross bars, means at the upper side of one of said cross bars for pivotally connecting the same to the body, and a locking device disposed above the other cross-bar and connected thereto at an intermediate point, said locking device being adapted to extend through the car body and having means permitting engagement with, and disengagement from said body to lock and release the holder, substantially as described.

6. In combination with a car-body, a stationary support beneath the body, a holder pivotally suspended from said support, and having a fender apron slidably mounted therein and projecting forwardly therefrom, when in position of use, said holder and apron being normally actuated to swing about the pivotal axis thereof, so as to move the front end of the apron downward, a locking-bar pivotally connected to the holder in the rear of its pivot and extending upwardly through the car-body, means on the body for engaging said bar to hold the apron in raised position, and means permitting swinging movement of the bar to disengage the same from the body and permit the apron to swing to lowered position, substantially as described.

7. In combination with a car-body, a fender pivotally suspended at an intermediate point, from said body, and normally actuated to swing its front end downwardly, a locking bar connected to the rear end of said fender and disposed to extend upwardly through the car-body, engaging means for said bar on said body for holding said fender in raised position, and means permitting disengagement of said bar and said body to permit the fender to be lowered, substantially as described.

8. In combination with a car-body, a fender pivotally supported beneath the body, normally actuated to swing its front end downwardly, and having a portion thereof extending in the rear of its pivotal axis, a locking bar pivotally connected to the rear end of said portion and extending upwardly through the body, means on the body for engaging said bar to hold the same from upward movement and normally to hold the fender in raised position, and means permitting disengagement of said bar and body to permit the bar to be raised and the fender to be lowered, substantially as described.

9. In combination with a car-body, a fender pivotally supported thereon, and normally actuated to swing from raised to lowered position, a locking bar pivotally connected to the fender at one side of the pivotal support thereof, and having means for engaging the body to hold the fender in raised position, and means permitting said bar to be swung on its pivot to release the fender and to be moved longitudinally to permit the fender to be lowered or raised, substantially as described.

10. In combination with a car-body having a fender pivotally connected thereto and normally actuated at an intermediate point to move from raised to lowered position, a locking bar pivotally connected, at its lower end, to the fender, at one side of the pivotal connection thereof with the body, a handle at the upper end of said bar, an abutment on the car-body for engaging said bar to hold the fender in raised position, and means permitting disengagement of said abutment and said bar to release the fender, said bar being longitudinally and vertically movable in one direction, as the fender is lowered, and in the opposite direction to raise and reset the fender, substantially as described.

11. In combination with a car-body, a fender pivotally suspended at an intermediate point thereof beneath the body and normally actuated to swing its front end downwardly, an abutment on the body, and a locking bar pivotally connected to the fender in the rear of its pivot and extending upwardly therefrom above the floor level of the car and having a handle at its upper end, said bar having an upwardly facing shoulder disposed to engage said abutment to hold the fender in raised position, and being adapted to be swung forwardly to disengage said shoulder and abutment and to be raised longitudinally to permit the fender to be lowered, substantially as described.

12. In combination with a car-body, a fender pivoted thereto at an intermediate point, and normally actuated to move from raised to lowered position, a lever pivotally mounted at one end, in the rear of the fender, extending forwardly thereover and having a pivotal connection at an intermediate point with the rear portion of the fender, an abutment on the car-body above the fender, a locking bar connected to the front end of said lever, extending upwardly therefrom and having an upwardly facing shoulder disposed to engage said abutment to hold the fender in raised position, and means permitting disengagement of said bar and said abutment to permit the fender to be lowered, substantially as described.

13. In combination with a car-body, a fender pivoted thereto at an intermediate point and normally actuated to move from raised to lowered position, a lever pivotally mounted at one end, in the rear of the fender, extending forwardly thereover and having a pivotal connection at an intermediate point with the rear portion of the fender, an abutment on the car-body above the fender, a locking bar pivotally connected to the front end of said lever, extending vertically upward therefrom and having an upwardly facing shoulder disposed to engage said abutment to hold the fender in raised position, and means permitting said bar to be swung forwardly to disengage it from said abutment and to be moved longitudinally, to permit the fender to be lowered, substantially as described.

14. In combination with a car-body, a fender pivotally suspended, at an intermediate point, from said body, a spring for moving the fender to its lowered position, a locking bar connected to said fender, in the rear of its pivot, and adapted to engage the body to hold the fender in raised position, and means permitting disengagement of said bar and the body to permit the fender to be moved to lowered position by the spring, substantially as described.

15. In combination with a car-body, a holder pivotally suspended from said body and having a fender apron slidably mounted thereon, a spring disposed to engage the holder and to move the apron to lowered position, a locking device disposed to engage said holder to hold the apron in raised position, and means permitting release of said holder by said locking device, to permit the apron to be moved to its lowered position, substantially as described.

16. In combination with a car-body, a holder pivotally suspended from said body and having a fender apron slidably mounted thereon, a spring disposed to engage the holder and to move the apron to lowered position, a locking bar connected to said holder and disposed to engage the body to hold the apron in raised position, and means permitting disengagement of the bar and the body to permit the apron to be lowered, substantially as described.

In testimony whereof, I have signed my name to this specification, in the presence of two subscribing witnesses.

JOHN MYLOTT.

Witnesses:
L. H. HARRIMAN,
H. B. DAVIS.